US005987317A

United States Patent [19]
Venturini

[11] Patent Number: 5,987,317
[45] Date of Patent: Nov. 16, 1999

[54] AUTOMATIC PUBLIC/AUTONOMOUS SYSTEM MESSAGE WAITING INDICATOR (MWI) RECOGNITION

[75] Inventor: Kelly Venturini, Dallas, Tex.

[73] Assignee: Nokia Mobile Phones Limited, Espoo, Finland

[21] Appl. No.: 08/886,479

[22] Filed: Jul. 1, 1997

[51] Int. Cl.⁶ ..................................................... H04Q 7/20
[52] U.S. Cl. .......................... 455/412; 455/413; 455/435; 455/552; 379/88.12; 379/88.25
[58] Field of Search ..................... 455/412, 413, 455/67.1, 435, 552, 553, 426, 461; 379/88.4, 88.11, 88.12, 88.22, 88.25, 88.18, 88.17, 88.24

[56] References Cited

U.S. PATENT DOCUMENTS

| | | | |
|---|---|---|---|
| 4,612,416 | 9/1986 | Emerson et al. | 379/88.18 |
| 5,454,030 | 9/1995 | De Oliveira et al. | 379/88.18 |
| 5,745,551 | 4/1998 | Strauch et al. | 455/412 |
| 5,802,466 | 9/1998 | Gallant et al. | 455/413 |
| 5,809,415 | 9/1998 | Rossmann | 445/422 |
| 5,819,172 | 10/1998 | Campana, Jr. et al. | 455/412 |
| 5,889,839 | 3/1999 | Beyda et al. | 455/412 |

OTHER PUBLICATIONS

IS–136 Rev A, Post–Ballot Version, Feb. 12, 1996, pp. 149–152; 170; 209–210; 236–241.

Primary Examiner—Curtis A. Kuntz
Assistant Examiner—Binh K. Tieu
Attorney, Agent, or Firm—Perman & Green, LLP

[57] ABSTRACT

A cellular radiotelephone (user terminal) (10) includes a keypad (22) having a plurality of keys (22a, 22b) and a display device (20) for displaying information, including messages, to a user. A method includes the steps of registering the user terminal with one of a plurality of networks, such as one of a first network or a second network, and receiving a signal at the user terminal indicating that at least one message is stored in a storage device associated with a message station within the network. The storage device stores voice messages for the radiotelephone. In response to receiving the signal, a step is performed of notifying the user that at least one message is stored in the storage device of the network with which the radiotelephone is registered. The user can request to retrieve the stored messages by depressing at least one predetermined key on the keypad. The user terminal responds to the user's request by determined the network with which the user terminal is registered, and then communicating with this network to retrieve the messages. Also, in accordance with the invention, the user can specify access codes for the storage device of each network. Identifier tags may also be employed to further identify the storage device of each network. The first and second networks include an autonomous network and a public network, respectively.

27 Claims, 8 Drawing Sheets

AUTOMATIC PUBLIC/AUTONOMOUS SYSTEM MESSAGE WAITING INDICATOR (MWI) RECOGNITION

FIELD OF THE INVENTION

This invention relates generally to radiotelephones and, in particular, to mobile terminals such as those capable of operation with a cellular network.

BACKGROUND OF THE INVENTION

The use of so-called voice mail message services in a communications (cellular) network is known. Voice mail message services enable users of radiotelephones (also referred to as user terminals or mobile terminals or stations), to receive voice messages left by calling parties when, by example, the user terminal is powered off or is otherwise not available, or if for some reason the user desires not to receive a call at a certain time. The voice messages are stored in pre-assigned storage locations typically referred to as "voice mailboxes". A message switching center is generally employed for controlling the forwarding of the voice messages to the user terminal from the voice mailbox. Typically, a user of a terminal can retrieve voice messages stored in a particular voice mailbox by operating a keypad of the terminal to enter appropriate information into the terminal. By example, the user may retrieve the voice messages stored in a particular voice mailbox by depressing multiple predetermined keys of the keypad to specify an appropriate access code for the voice mailbox, or by depressing a single predetermined one of the keys of the keypad which causes the terminal to automatically dial the access code. In either case, the terminal responds to this information by communicating with the message switching center to retrieve the messages from the voice mailbox. Thereafter, the messages are provided to the user.

At least some conventional cellular systems include both public networks (or systems) and private or autonomous networks (or systems). Autonomous networks include private and residential networks, and provide service to users located within a small, generally confined geographical area such as, for example, a house or a building. Public networks provide service to users located within a large geographical area relative to the area serviced by a private network.

At least some conventional networks provide a convenient mechanism whereby a user of a user terminal can be notified if there are one or more messages stored in a particular voice mailbox upon the terminal becoming registered with a network. This is accomplished by providing a notification message from the message switching center of the network to the user terminal, in response to the terminal becoming registered with the network. By example, in response to a user terminal registering with the network, the message switching center may provide a Message Waiting indicator (MWI) message to the terminal, in accordance with standard IS-136 section 6.4.3.8. The MWI message indicates that there are messages stored in the voice mailbox. The messages stored in the voice mailbox can be retrieved by the user by operating the user terminal in the manner described above. For example, assuming that the terminal is preprogrammed to access a particular voice mailbox within a public network in response to the user depressing a specific, single key of the terminal keypad, the user can retrieve messages stored in this voice mailbox by simply depressing this single key.

Unfortunately, however, conventional user terminals do not have the capability of automatically determining which network the terminal is registered with in response to a user of the terminal requesting that messages be retrieved from a voice mailbox, so that the terminal can automatically access messages in the voice mailbox of the network with which the terminal is registered. As a result, a user may be required to enter specific access codes into the terminal when attempting to retrieve messages from voice mailboxes within particular networks. As can be appreciated, this may be burdensome to the user.

It can be appreciated that it would be desirable to provide a user terminal which overcomes this problem.

OBJECTS OF THE INVENTION

It is thus a first object of this invention to provide a user terminal that identifies a network with which the user terminal is registered in response to a user's request to retrieve messages from a voice mailbox, and which then automatically communicates with the voice mailbox of the network with which the user terminal is registered so as to retrieve the messages stored in the voice mailbox.

It is another object of this invention to provide a user terminal having a capability for allowing users to define access codes for voice mailboxes within public and autonomous networks.

SUMMARY OF THE INVENTION

The foregoing and other problems are overcome and the objects of the invention are realized by methods and apparatus in accordance with embodiments of this invention. A method of this invention is disclosed for operating a user terminal, such as a cellular radiotelephone, of a type that is bidirectionally coupled to one of a plurality of networks, such as a first network (e.g., a public network) or a second network (e.g., an autonomous network such as a private network or a residential network). Each of the first and second networks includes a respective message station having an associated storage device (also referred to as a voice mailbox) for storing messages (e.g., voice messages) received by the message station for the user terminal. The user terminal includes a keypad having a plurality of keys and a display device for displaying information, including messages, to a user. The message station has an associated memory or storage device.

In accordance with one aspect of the invention, a method for operating the user terminal includes the steps of: (a) prompting a user to select an access code setup function for the storage device of either of the first or second networks; (b) monitoring an output of the keypad to detect information specifying that the user selects an access code setup function for the storage device of a user-selected one of the first or second networks; (c) prompting the user for defining an access code for the storage device of the selected network; (d) monitoring an output of the keypad to detect information specifying the access code for the storage device of the selected network, and, in response to detecting the information, storing the information specifying the access code in a memory of the user terminal.

Also, a user of the user terminal can be notified if there are messages stored in a voice mailbox of a network upon the user terminal becoming registered with the network, and can request that these messages be automatically retrieved by operating the user terminal in a manner as will be described below. In accordance with this aspect of the invention, a step is performed of registering the user terminal with one of the first and second networks. In response to the user terminal registering with one of the networks, the message station of the network determines whether or not there are messages stored in the network voice mailbox for the user terminal. If the message station determines that there are one or more messages stored in the network voice mailbox, then the message station transmits a first signal (e.g., a Message Waiting Indicator (MWI) message) to the user terminal. In response to receiving the first signal, the user terminal notifies the user that at least one message is stored in the voice mailbox of the network with which the user terminal is registered. Preferably, this notification is provided to the user via a message displayed on the display of the user terminal.

A next step includes monitoring the output of the keypad to detect user inputted information specifying that a message stored in the network voice mailbox be retrieved. The user may specify that the message be retrieved by, for example, depressing one or more predetermined keys of the keypad, or by depressing one specific key (e.g., a "1" key) of the keypad for a predetermined time period. For either case, the user terminal responds to the user information by determining the network (autonomous or public) with which the user terminal is registered, dialing the access code for the voice mailbox of this network, and transmitting a second signal to the message station of the network. The second signal specifies that message stored in the network voice mailbox be retrieved.

In response to receiving the second signal from the user terminal, the message station of the network with which the terminal is registered transmits a third signal that includes at least one message from the network voice mailbox. After the user terminal receives the third signal from the message station, the user terminal provides the at least one message to the user, preferably via a speaker of the user terminal.

In accordance with another aspect of the invention, an identifier tag corresponding to a network voice mailbox may be employed in the user terminal. The identifier tag is preferably displayed in response to the user terminal transmitting the second signal specifying that the stored messages be retrieved from the voice mailbox of the network with which the terminal is registered. The identifier tag may be predefined by the user of the user terminal, may be prestored in the memory of the user terminal as a default value, or may be defined in accordance with an identifier tag received from the network in a registration message.

While described below primarily in the context of a user terminal operable with first and second networks, it should be kept in mind that the teachings of this invention apply as well to user terminals operable with three or more networks, such as a public, a private, and a residential network, wherein each of the plurality of networks can maintain a voice mailbox for the user terminal.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 2:
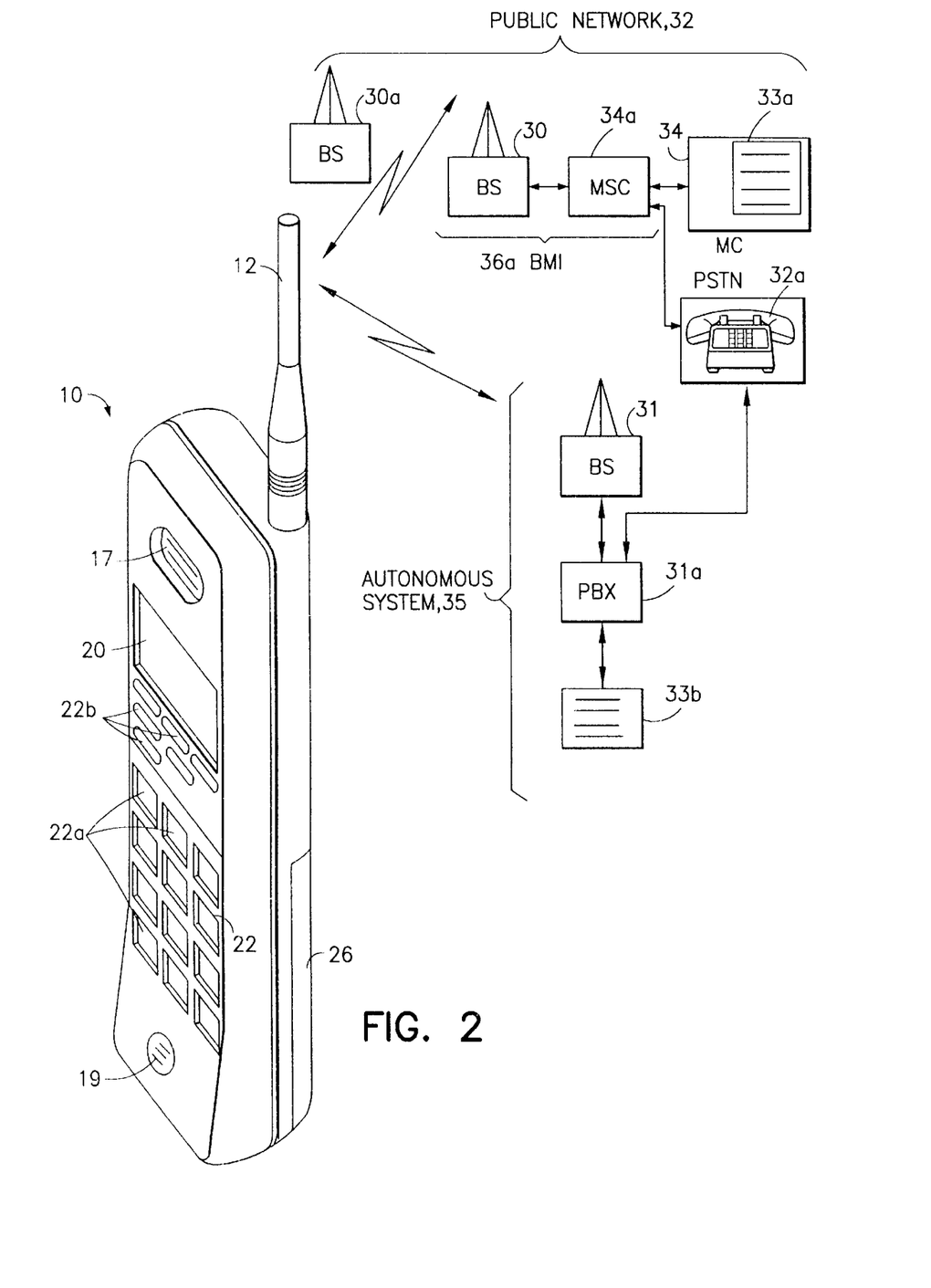
FIG. 2 is an elevational view of the mobile terminal shown in FIG. 1, and also illustrates an autonomous cellular communication system to which the mobile terminal is bidirectionally coupled through wireless RF links, and a public cellular communication system to which the mobile terminal is bidirectionally coupled through wireless RF links.

Reference is made to FIG. 2 for illustrating an autonomous cellular network 35, a public cellular network 32, and a mobile terminal 10 (also referred to as a "user terminal"), in particular a cellular radiotelephone, that is suitable for practicing this invention. The mobile terminal 10 includes an antenna 12 for transmitting signals to and for receiving signals from a base station 30 of the public network 32 and a base station 31 of the autonomous network 35. The autonomous network 35 includes the base station 31, a Private Branch Exchange (PBX) (also referred to as a "message station") 31a, and a memory or storage device 33b that is associated with the PBX 31a. The PBX 31a controls the forwarding of messages to the mobile terminal 10 when the mobile terminal 10 is registered with the network 35, and also controls the forwarding of messages for the mobile terminal 10 to and from the memory 33b. The messages may include, by example, voice messages received by the PBX 31a from users of Public Switched Telephone Network (PSTN) telephones 32a, and voice messages received by the PBX 31a from users of mobile terminals (not shown) within the public networks and private networks (including networks 32 and 35).

The public network 32 includes a Base Station (BS), Mobile Switching Center (MSC) and Interworking Function, which is also referred to as a BMI 36a, and a Message Center (MC) 34 that includes a memory 33a. The BMI 36a includes the base station 30, and a Message Switching Center (MSC) 34a. The MSC 34a controls the forwarding of messages to the mobile terminal 10 when the mobile terminal 10 is registered with the network 32, and also controls the forwarding of messages for the mobile terminal 10 to and from the memory 33a of the MC 34.

These messages may include, by example, voice messages received by the MSC 34a from users of Public Switched Telephone Network (PSTN) telephones 32a, and voice messages received by the MSC 34a from users of mobile terminals (not shown) within the public networks a nd private networks (including networks 32 and 35).

It should be noted that the public cellular network 32 may also include one or more additional base stations 30a that communicate with the mobile terminal 10, although for the purposes of convenience, only base station 30 of the network 32 will be referred to in this description.

Also, for convenience, the memory 33a is hereinafter referred to as a "public network voice mailbox" (PNVMB) 33a, and memory 33b is hereinafter referred to as an "autonomous network voice mailbox" (ANVMB) 33b.

Figure 1:
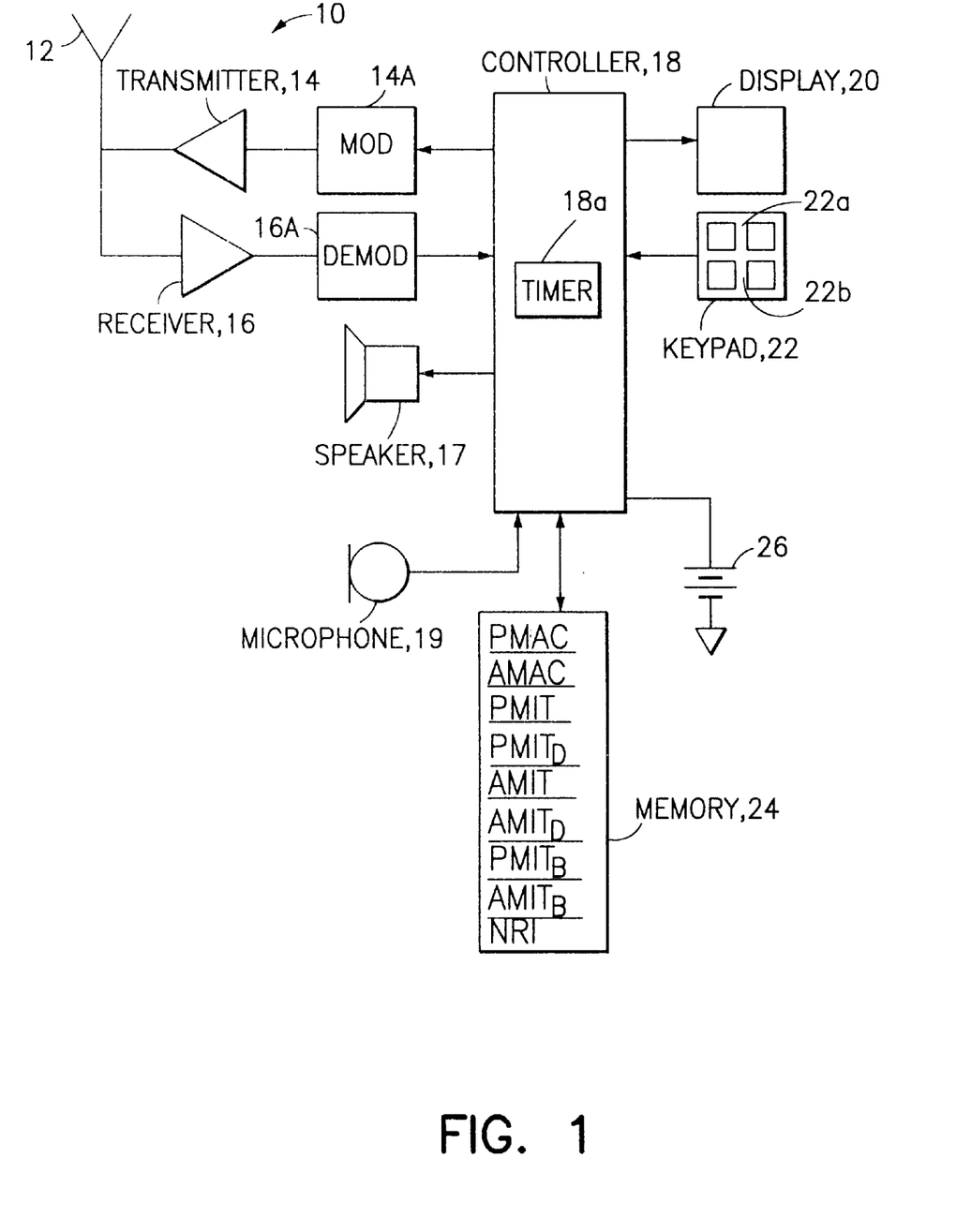
FIG. 1 is a block diagram of a mobile terminal that is constructed and operated in accordance with this invention.

Reference is now made to FIG. 1 for illustrating the mobile terminal 10 in greater detail. The mobile terminal 10 includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data.

A user interface includes a conventional speaker 17, a conventional microphone 19, a display 20, and a user input device, typically a keypad 22, all of which are coupled to the controller 18. The keypad 22 includes the conventional numeric (0–9) and related keys (#,*) 22a, and also other keys 22b used for operating the mobile terminal 10. These other keys 22b include, by example, a SEND key, various menu scrolling and soft keys, and a PWR key.

The mobile terminal 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). Also by example, and in accordance with the invention, the memory 24 stores a value of a public mailbox access code (PMAC) and a value of an autonomous mailbox access code (AMAC). The memory 24 also stores public mailbox identifier tag information that is stored as a variable PMIT, default public mailbox identifier tag information that is stored as a constant $PMIT_D$, and other, received public mailbox identifier tag information that is stored as a variable $PMIT_B$. Also in accordance with this embodiment of the invention, the memory 24 stores autonomous mailbox identifier tag information that is stored as a variable AMIT, default autonomous mailbox identifier tag information that is stored as a constant $AMIT_D$, and other, received autonomous mailbox identifier tag information that is stored as a variable $AMIT_B$. The AMIT and PMIT information is preferably programmed into the mobile terminal 10 by the user of mobile terminal 10 in a manner as will be described below, and the information stored as constants $AMIT_D$ and $PMIT_D$ is preferably prestored in the memory 24. Also, the information stored as respective variables $AMIT_B$ and $PMIT_B$ is preferably received by the mobile terminal 10 during a registration procedure with the respective networks 35 and 32, before being stored in the memory 24, as will also be described below. Furthermore, the memory 24 stores information indicating the network with which the mobile terminal 10 is presently registered. This information is referred to as Network Registration Indicator (NRI) information, and may be updated by the mobile terminal 10 upon registering with a network in any suitable manner known in the art.

An operating program for controlling the operation of controller 18 is also stored in the memory 24 (typically in a ROM device). The memory 24 further stores data, including user messages, that are received from the private and/or public cellular networks 35 and 32 prior to being provided to the user via the display 20 or the speaker 17. The mobile terminal 10 also includes a battery 26 for powering the various circuits that are required to operate the terminal, and, in accordance with one embodiment of the invention, the controller 18 includes a timer 18a.

It should be understood that the mobile terminal 10 can be a vehicle mounted or a handheld device. It should further be appreciated that the mobile terminal 10 can be capable of operating with one or more air interface standards, modulation types, and access types. It should thus be clear that the teaching of this invention is not to be construed to be limited to any one particular type of mobile terminal or air interface standard.

The operating program in the memory 24 includes routines to present messages and message-related functions to the user on the display 20, typically as various menu items. The memory 24 also includes routines for implementing the methods described below in relation to FIGS. 3A–3D and FIGS. 4A and 4B. The menu functions described below with respect to FIG. 3A–3D and FIGS. 4A and 4B are hereinafter collectively referred to as "voice mail menu functions".

Figure 3A:
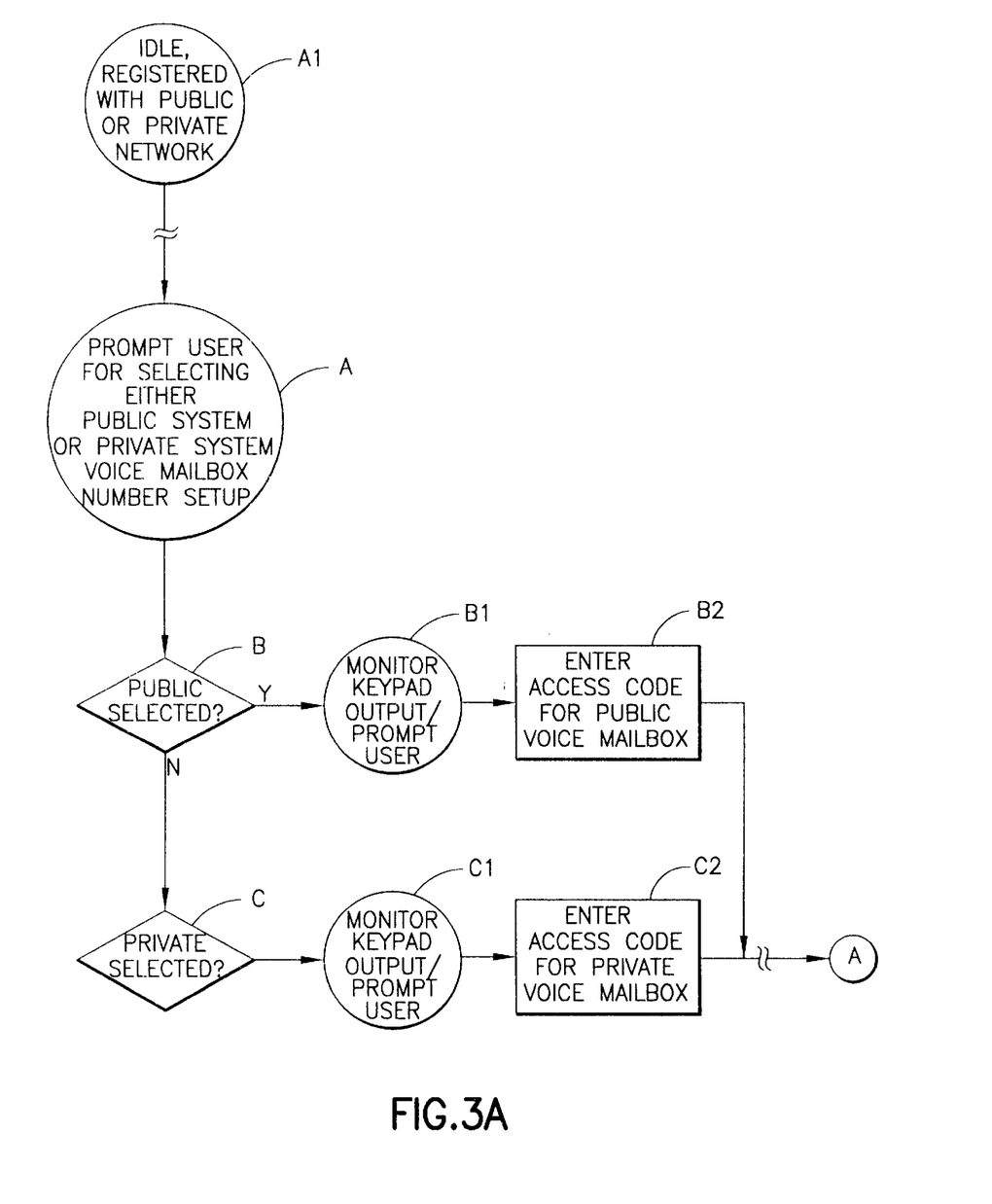
FIGS. 3A–3C are logic flow diagrams that illustrate a method in accordance one embodiment of the invention.
Figure 3B:
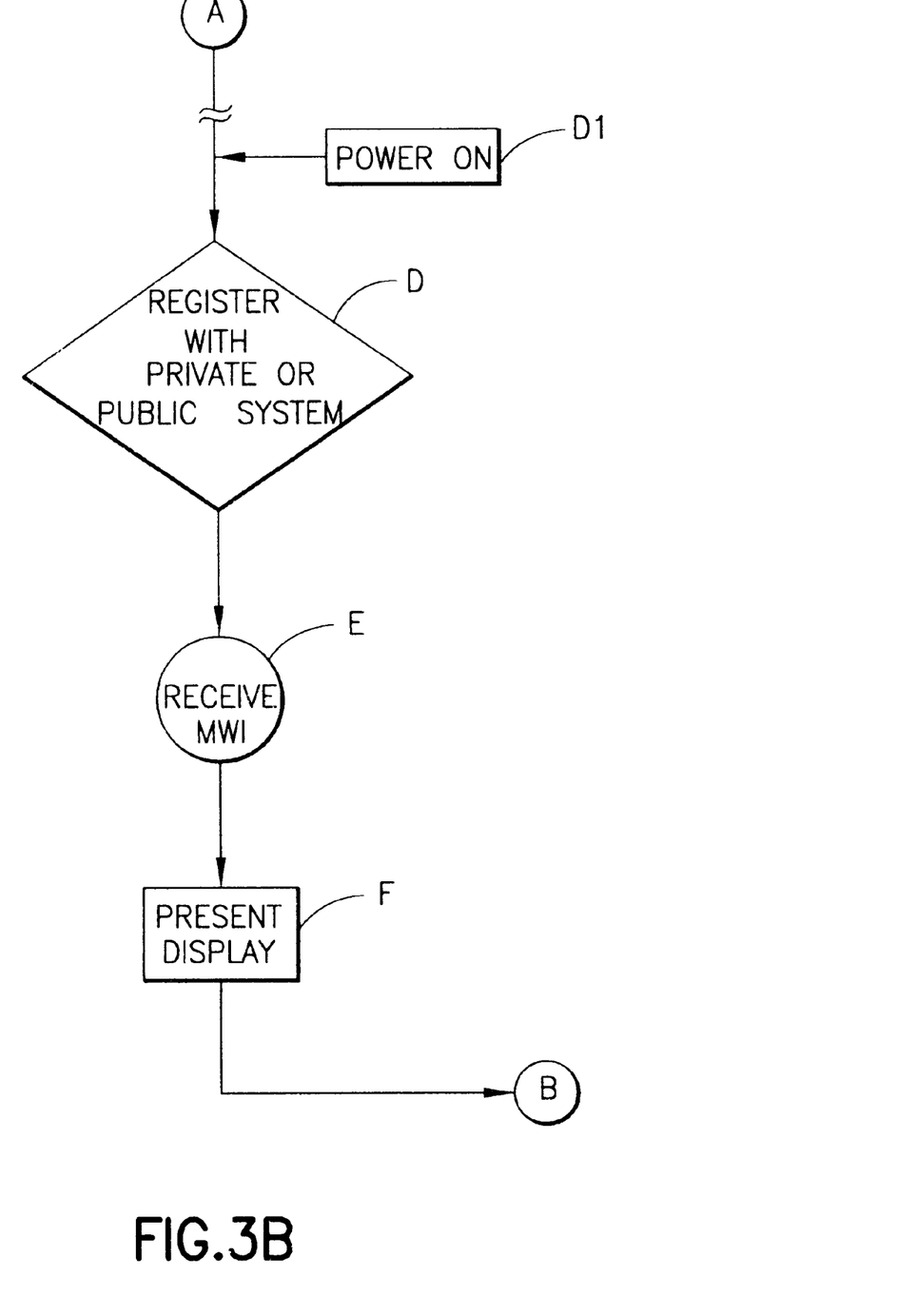
Figure 3C:
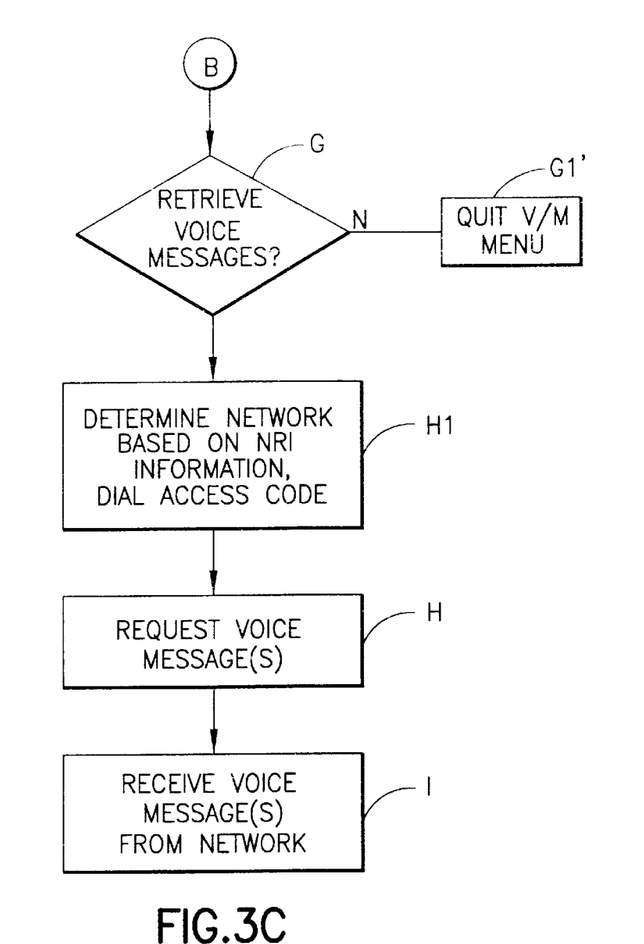

Reference is now made to FIGS. 3A–3C for illustrating a method in accordance with one embodiment of this invention. At Block A1 the mobile terminal 10 is considered to be in an idle state. The user enters a voice mail menu function which prompts the user to select either a setup function for a public network voice mailbox access code or a setup function for an autonomous network voice mailbox access code (block A). At block B the mobile terminal 10 monitors the output of the keypad 22 to determine if the user has depressed a predetermined one or more of the keys of keypad 22 indicating that the setup function for the public network voice mailbox access code is selected. If Yes at block B, then control passes to block B1. At block B1 a menu function is entered which prompts the user for specifying an access code for the public network voice mailbox 33a, and the controller 18 monitors the output of keypad 22 for the specified access code. In response to the menu function of block B1, the user of the mobile terminal 10 should specify values of a desired access code for the public network voice mailbox 33a by depressing selected ones of the keys (e.g., numeric keys) of the keypad 22 (block B2). The access code for the public network voice mailbox 33a may include, for example, seven, ten, or eleven digits, or any other suitable number of digits and/or characters. The information specified by the user via keypad 22 is entered into the controller 18, which responds to this information by storing it in the memory 24 as the variable PMAC.

If No at block B, and if the mobile terminal 10 determines that the user has depressed a predetermined one or more of the keys of keypad 22 indicating that the autonomous network voice mailbox access code setup function is selected (block C), then control passes to block C1. At block C1 a menu function is entered which prompts the user for specifying values of an access code for the autonomous network voice mailbox 33b, and the controller 18 monitors the output of keypad 22 for the specified access code. In response to the menu function of block C1, the user of the mobile terminal 10 should specify values of a desired access code for the autonomous network voice mailbox 33b by depressing selected ones of the keys (e.g., numeric keys) of the keypad 22 (block C2). The access code for the autonomous network voice mailbox 33b may include, for example, four or five digits, or any other desired numbers of digits and/or characters. The information specified by the user via keypad 22 is entered into the controller 18, which responds to this information by storing it in the memory 24 as the variable AMAC.

As can be appreciated in view of the above description, and in accordance with the invention, the performance of the steps designated by the blocks of FIG. 3A enable the user to specify access codes for the public network voice mailbox 33a and the autonomous network voice mailbox 33b. Voice messages stored in the public network voice mailbox 33a, and voice messages stored in the autonomous network voice mailbox 33b, can thus be retrieved by the user entering the respective access codes for these mailboxes into the mobile terminal 10.

Sometime after the steps represented by the blocks shown in FIG. 3A are performed, it is assumed that the mobile terminal 10 becomes registered with either the autonomous network 35 or the public network 32 (block D), and that the NRI information is updated to reflect that the user terminal 10 is registered with this network. The manner in which the mobile terminal 10 registers with the autonomous network 35 may be in accordance with, by example, section 6.3.14 of IS-136.1 Revision A or later revisions thereof, and the manner in which the mobile terminal 10 registers with the public network 32 may be in accordance with, by example, section 6.3.7 of IS-136.1 Revision A or later revisions thereof.

For a case in which the mobile terminal 10 becomes registered with the autonomous network 35 at block D, then the PBX 31 responds by checking voice mailbox 33b to determine whether or not there are messages stored in the voice mailbox 33b. The voice mailbox 33b may be checked for the presence of stored messages in accordance with any suitable technique. Assuming that the PBX 31a determines that there are one or more messages stored in the voice mailbox 33b, then the PBX 31a transmits a message to the mobile terminal 10 via the base station 31 (block E). The message indicates that there are one or more messages stored in the voice mailbox 33b.

For a case in which the mobile terminal 10 becomes registered with the public network 32 at block D, then the MSC 34a responds by checking voice mailbox 33a to determine whether or not there are messages stored in the voice mailbox 33a. The voice mailbox 33a may also be checked for the presence of stored messages in accordance with any suitable technique. Assuming that the MSC 34a determines that there are one or more messages stored in the voice mailbox 33a, then the MSC 34a transmits a message to the mobile terminal 10 via the base station 31 (block E). The message indicates that there are one or more messages stored in the voice mailbox 33a.

The messages transmitted by the PBX 31a or the MSC 34a at block E may have a format similar to a Message Waiting Indicator (MWI), as is specified in IS-136.1, Revision A, section 6.4.3.8 or later revisions thereof. For the purposes of this description, this message is hereinafter referred to as a MWI message.

Figure 5:
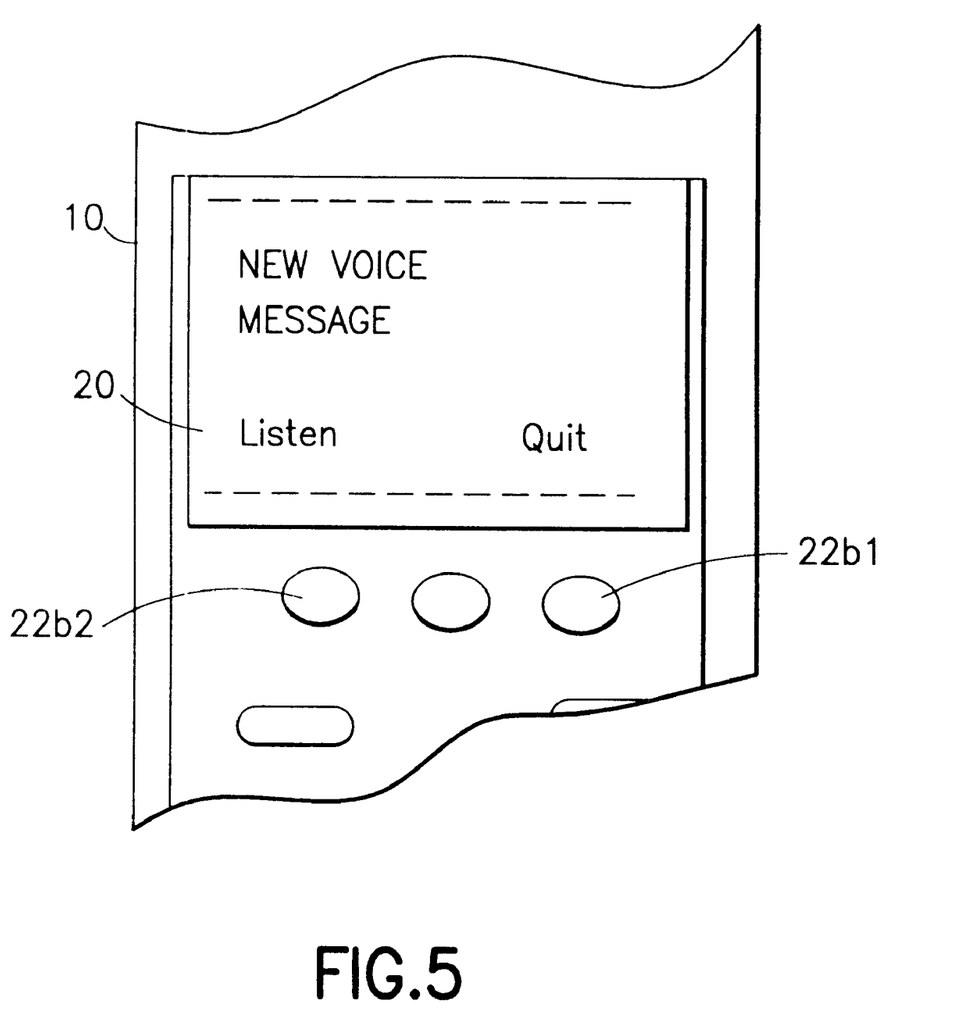
FIG. 5 shows a message displayed by a display 20 of a portion of the mobile terminal of FIGS. 1 and 2 during a step indicated by block F of the logic flow diagram of FIG. 3B, in accordance with one embodiment of the invention.

In response to receiving the MWI message from the network with which the mobile terminal 10 registered at block D, the mobile terminal 10 notifies the user that there are one or more messages stored in the voice mailbox of this network. In accordance with a preferred embodiment of the invention, the mobile terminal 10 notifies the user of these messages by presenting a message on the display 20 indicating that there are voice messages stored in the voice mailbox of the network with which the terminal 10 is registered (block F). By example, in accordance with one embodiment of the invention the message presented on the display 20 may have a format similar to that shown on the display 20 of the portion of the mobile terminal 10 shown in FIG. 5, although in other embodiments other suitable message formats may be employed.

After the step indicated by block F is performed, control passes to block G through connector B (see FIG. 3C). At block G, the mobile terminal 10 awaits the depression of one or more keys of the keypad 22 by the user, indicating whether or not the user wishes to retrieve the messages from the voice mailbox of the system with which the mobile terminal 10 is registered. If the mobile terminal 10 determines that the user has depressed one or more predetermined keys indicating that the user does not wish to be provided with the messages from the voice mailbox (indicated by "N" at block G), then the mobile terminal 10 quits the voice mail menu functions (block G1'). By example, the user may indicate a desire to not be provided with the stored messages by depressing one of the softkeys 22b located underneath the word "Quit" from the displayed message of FIG. 5. This softkey is identified by label "22b1" in FIG. 5.

To retrieve the messages stored in the voice mailbox of the network with which the mobile terminal 10 is registered, the user responds to the message displayed at block F by depressing one or more predetermined keys indicating that the user requests that the messages from the voice mailbox be retrieved. This step is indicated by "Y" at block G. By example, and in accordance with the invention, the user may request that the messages stored in the voice mailbox be retrieved by depressing a softkey 22b on keypad 22 located directly underneath the word "Listen" from the displayed message of FIG. 5. This softkey is labeled "22b2" in FIG. 5.

In response to the user depressing key 22b2, and in accordance with an aspect of this invention, the user terminal 10 determines the network (autonomous or public) with which the mobile terminal 10 is registered, based on the NRI information (which indicates this network), and thereafter recognizes that the user wishes to retrieve the messages stored in the voice mailbox of the network indicated by the NRI information. The mobile terminal 10 then automatically dials the prestored access code for the voice mailbox of the network indicated by the NRI information (block H1).

After the mobile terminal 10 dials the access code, the mobile terminal 10 sends a message to the network with which the mobile terminal 10 is registered (block H). The message transmitted by the mobile terminal 10 at block H includes a request that the voice messages from the voice mailbox of this network be provided to the mobile terminal 10. For a case in which the message is transmitted to the autonomous network 35, the PBX 31a retrieves the voice messages from voice mailbox 33b, and transmits a signal that includes the retrieved voice messages back to the mobile terminal 10. For a case in which the message is transmitted to the public network 32, the MSC 34a retrieves the voice messages from voice mailbox 33a, and transmits a signal that includes a retrieved voice message back to the mobile terminal 10. For either case, the signal transmitted from the network is received at the mobile terminal 10 at block I, where the voice messages may be provided to the user via speaker 17. The manner in which the individual steps of blocks G, H, and I are performed may be in accordance with any suitable technique.

As can be appreciated in view of the above description, the performance of the steps designated by the blocks of FIGS. 3B and 3C enables the mobile terminal 10 to be provided with a MWI message upon the mobile terminal 10 becoming registered with either the autonomous network 35 or the public network 32, assuming that there are one or more messages stored in the voice mailbox of the network. Thereafter, the user can elect to retrieve the messages from the voice mailbox by simply depressing the softkey 22b2. In response to the user depressing this key 22b2, and in accordance with the invention, the mobile terminal 10 examines the NRI information to determine the network with which the mobile terminal 10 is registered, and then dials the access code for the voice mailbox of this network in order to request the retrieval of the voice messages stored in the voice mailbox.

It should be noted that a MWI message may be provided from one of the networks 32 or 35 to the mobile terminal 10 in response to the mobile terminal 10 registering with the network in accordance with any suitable technique, such as, for example, those registration techniques defined in standard IS-136. By example, a MWI message may be provided from one network to the mobile terminal 10 in response to the mobile terminal 10 registering with the network immediately after being registered with another network. Also by example, a MWI message may be provided from the network to the mobile terminal 10 in response to the mobile terminal 10 registering with the network after the mobile terminal 10 is powered on. In this case the method of the invention is performed in a similar manner as was described above, except that the method begins at block D1 in FIG. 3B, where it is assumed that the mobile terminal 10 is powered on.

Another aspect of the invention will now be described. As was described above, in accordance with one embodiment of the invention the user may request to retrieve messages stored in a voice mailbox of the network with which the mobile terminal 10 is registered by depressing a softkey 22b2 on keypad 22 (block G). In accordance with another embodiment of the invention, the user may request the retrieval of messages stored in the voice mailbox of this network by depressing one or more predetermined keys on the keypad 22 (such as, by example, the "1" key) for at least a predetermined time period (e.g., 2 seconds) specified by controller 11. In this embodiment of the invention, the method described above may be performed in a similar manner as was described above, except that the step of block G described above is replaced with steps represented by blocks G1–G3 of FIG. 3d. More particularly, after the step of presenting the display to the user is performed at block F, control is passed to block G1. If at block G1 the mobile terminal 10 determines that the user has depressed one or more predetermined keys indicating that the user does not wish to be provided with the voice mail messages (indicated by "N" at block G1), then the mobile terminal 10 quits the voice mail menu functions (block G4).

Figure 3D:
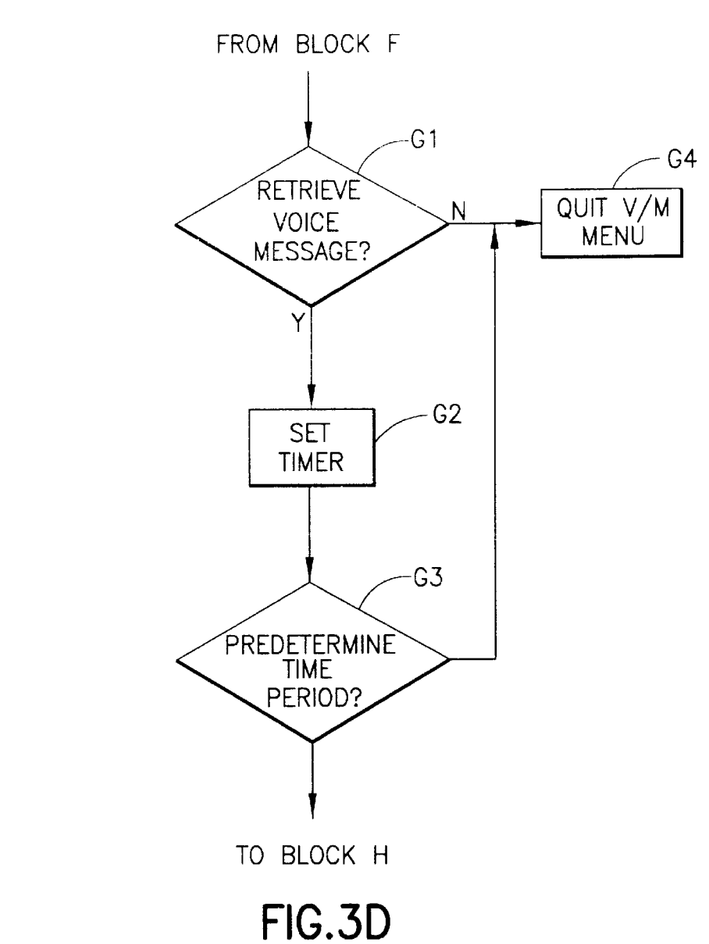
FIG. 3D is a logic flow diagram that illustrates a portion of the method of FIGS. 3A–3C performed in accordance with another embodiment of the invention.

If at block G1 the mobile terminal 10 determines that the user has depressed one or more predetermined keys (e.g., the "1" key) indicating that the user requests that the messages stored in the voice mailbox of the network with which the terminal 10 is registered be retrieved ("Y" at block G1), then control is passed to block G2. At block G2 the controller 18 of the mobile terminal 10 sets timer 18a to run for as long as the one or more predetermined keys (e.g., the "1" key) are depressed. When the controller 18 determines that the one or more predetermined keys are no longer depressed, the controller 18 responds by comparing the predetermined time period to the amount of time that elapsed during the depression of the key(s), as determined by the timer 18a (block G3), and also determines whether or not the key(s) were depressed for at least the predetermined time period. If yes at block G3, then control passes to block H1 (FIG. 3C) where the method of the invention is continued in a similar manner as was described above. If no at block G3, then the mobile terminal 10 quits the voice mail menu functions (block G4).

It should be noted that the steps indicated by blocks G1–G4 are not limited to being performed as part of the overall method of FIGS. 3A, 3B, and 3D. That is, at any time while the mobile terminal 10 is registered with one of the networks 32 or 35, the user may operate the keypad in the manner described above with respect to blocks G1–G4, so as to request the retrieval of messages stored in the voice mailbox of the network that the mobile terminal is currently registered with. The user need not wait until being notified (via a MWI message) of the presence of messages in the voice mailbox before requesting that the messages be retrieved in accordance with the steps of FIG. 3d.

A further aspect of the invention will now be described. In accordance with this aspect of the invention, an identifier tag may be employed to indicate to a user of the mobile terminal 10 that a request is being made to a network to retrieve messages stored in a voice mailbox of the network.

In accordance with this aspect of the invention, the user terminal 10 may employ identifier tags corresponding to those which may be received by the user terminal 10 in a message received from a network during a registration procedure. By example, identifier tag information may be included in a registration message provided to the user terminal by the autonomous network 35 during the process of registering the user terminal 10 with the network 35 at block D of FIG. 3B. The identifier tag information in this case may specify, by example, "Work Office System" (WOS). The portion of the registration message including the identifier tag information may have a format in accordance with that of, by example, Alphanumeric System ID information defined in section 6.5 of IS-136.1, Revision A, or later revisions thereof. In response to receiving the identifier tag information included with the registration message from the autonomous network 35, the mobile terminal 10 extracts the identifier tag information from the registration message, and stores the identifier tag information in the memory 24 as the variable $AMIT_B$. Also by example, identifier tag information may be included in a registration message provided to the user terminal 10 by the public network 32 during the process of registering the user terminal 10 with the network 32. The identifier tag information in this case may specify, by example, "Public System". In response to receiving the identifier tag information included with the registration message from the network 32, the mobile terminal 10 extracts the identifier tag information from the registration message, and stores the identifier tag information in the memory 24 as the variable $PMIT_B$. The manner in which the variables $AMIT_B$ and $PMIT_B$ are employed in the user terminal 10 will be described below.

Figure 4A:
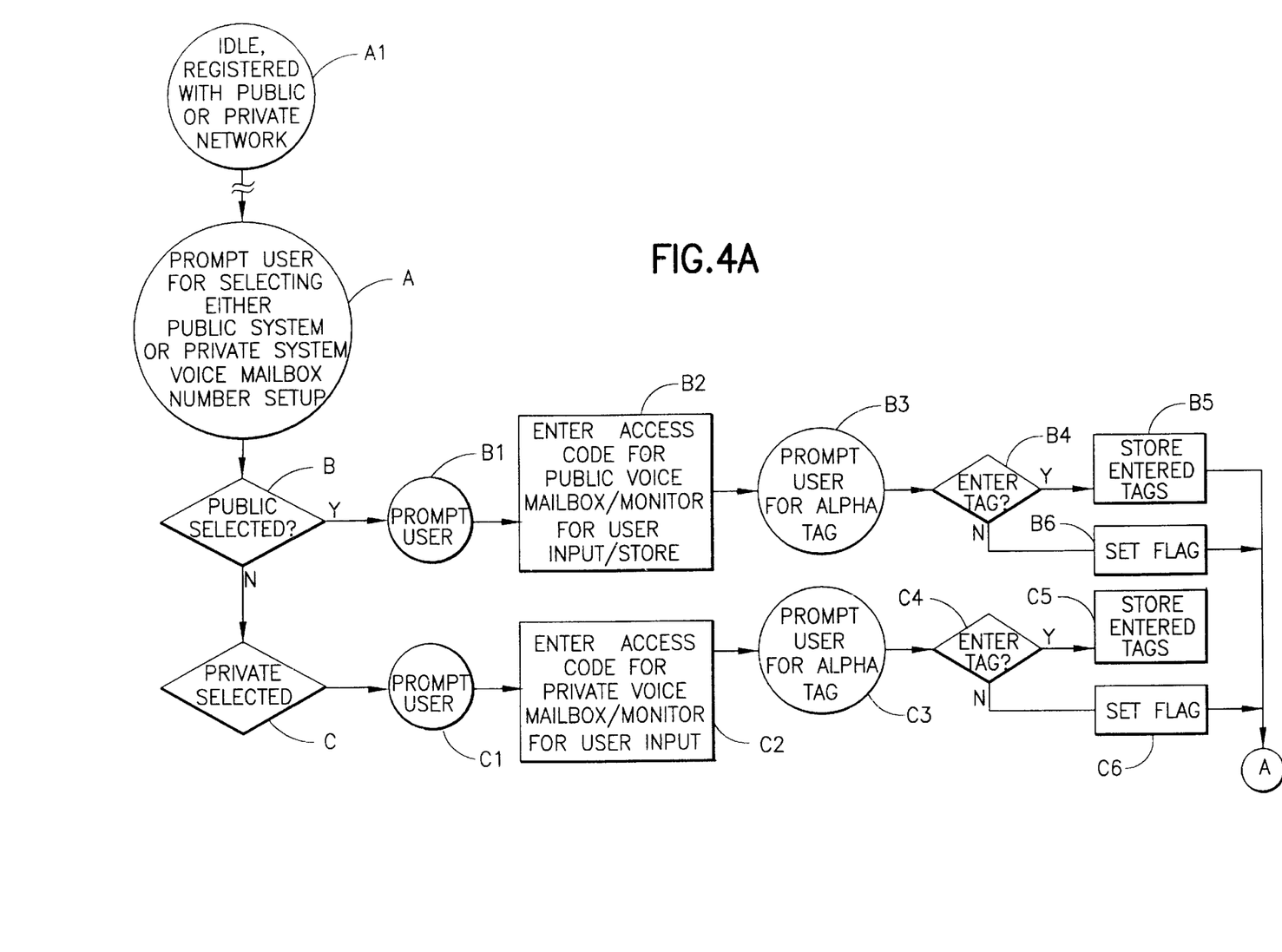
FIGS. 4A and 4B are logic flow diagrams that illustrate portions of the method of FIGS. 3A–3C performed in accordance with another embodiment of the invention.

Also, in accordance with this aspect of the invention, identifier tags corresponding to particular voice mailboxes may be specified by the user of the mobile terminal 10. This may be further understood in view of FIG. 4a, which shows a logic flow diagram similar to that of FIG. 3A, but which also includes additional blocks B3–B6 and C3–C6. The steps indicated by blocks A1, A, B–B2, and C–C2 if FIG. 4A are performed in a similar manner as was described above. However, after the steps indicated by blocks B–B2 are performed (for the case in which the setup function for the public network voice mailbox access code is selected and the user enters the access code at block B2 in response to the menu prompt of block B1), control passes to block B3. At block B3 a menu function is entered which prompts the user to either specify an identifier tag for the public network voice mailbox 33a, or to indicate that the user does not wish to specify an identifier tag. Thereafter, at block B4 the mobile terminal 10 monitors the output of the keypad 22 to determine whether the user depresses one or more predetermined keys of keypad 22 indicating that the user does not wish to specify an identifier tag (indicated by "N" at block B4), or whether the user depresses one or more keys of the keypad 22 indicating an identifier tag for the public network voice mailbox 33a (indicated by "Y" at block B4). If Yes at block B4, then the identifier tag specified by the user via keypad 22 is stored in the memory 24 as the variable PMIT (block B5), and then control passes to block D through connector A, in a similar manner as was described above. If No at block B4, then at block B6 the controller 18 sets a flag to later employ the default identifier tag constant $PMIT_D$ during the retrieval of voice messages stored in the public network voice mailbox 33a if no identifier tag information is received by the mobile terminal 10 from the public network 32. By example, the default identifier tag constant $PMIT_D$ may specify the phrase "Calling Public Voice Mailbox". Control then passes to block D through connector A in a similar manner as was described above. The information stored in memory 24 as constant $PMIT_D$ and the information stored as variable PMIT may have a format that is in accordance with, by example, Alphanumeric System ID information defined in section 6.5 of IS-136.1 Revision A or later revisions thereof.

Also in accordance with this aspect of the invention, after the steps indicated by blocks C–C2 are performed (for the case in which the setup function for the autonomous network voice mailbox access code is selected and the user enters the access code at block C2 in response to the menu prompt of block C1), control is passed to block C3. At block C3 a menu function is entered which prompts the user to specify an identifier tag for the autonomous network voice mailbox 33b, or to indicate that the user does not wish to specify an identifier tag for this voice mailbox 33b. Thereafter, at block C4 the mobile terminal 10 monitors the output of the keypad 22 to determine whether the user depresses one or more keys of the keypad 22 to indicate an identifier tag for the autonomous network voice mailbox 33b (indicated by "Y" at block C4), or depresses one or more predetermined keys of keypad 22 indicating that the user does not wish to specify an identifier tag (indicated by "N" at block C4) for the voice mailbox 33b. If No at block C4, then at block C6 the controller 18 sets a flag to later employ the default identifier tag constant $AMIT_D$ during the retrieval of messages stored in the autonomous network voice mailbox 33b if no identifier tag information is received by the mobile terminal 10 from the autonomous network 35. The default identifier tag $AMIT_D$ may specify a phrase such as, by example, "Calling Private Voice Mailbox". Control is then passed to block D through connector A in a similar manner as was described above. If Yes as block C4, then identifier tag information specified by the user via keypad 22 is stored in the memory 24 as variable AMIT (block C5), and control then passes to block D through connector A in the manner described above. The information stored in memory 24 as constant $AMIT_D$ and the information stored as variable AMIT may have a format that is in accordance with, by example, Alphanumeric System ID information defined in section 6.5 of IS-136.1 Revision A or later revisions thereof.

Figure 4B:
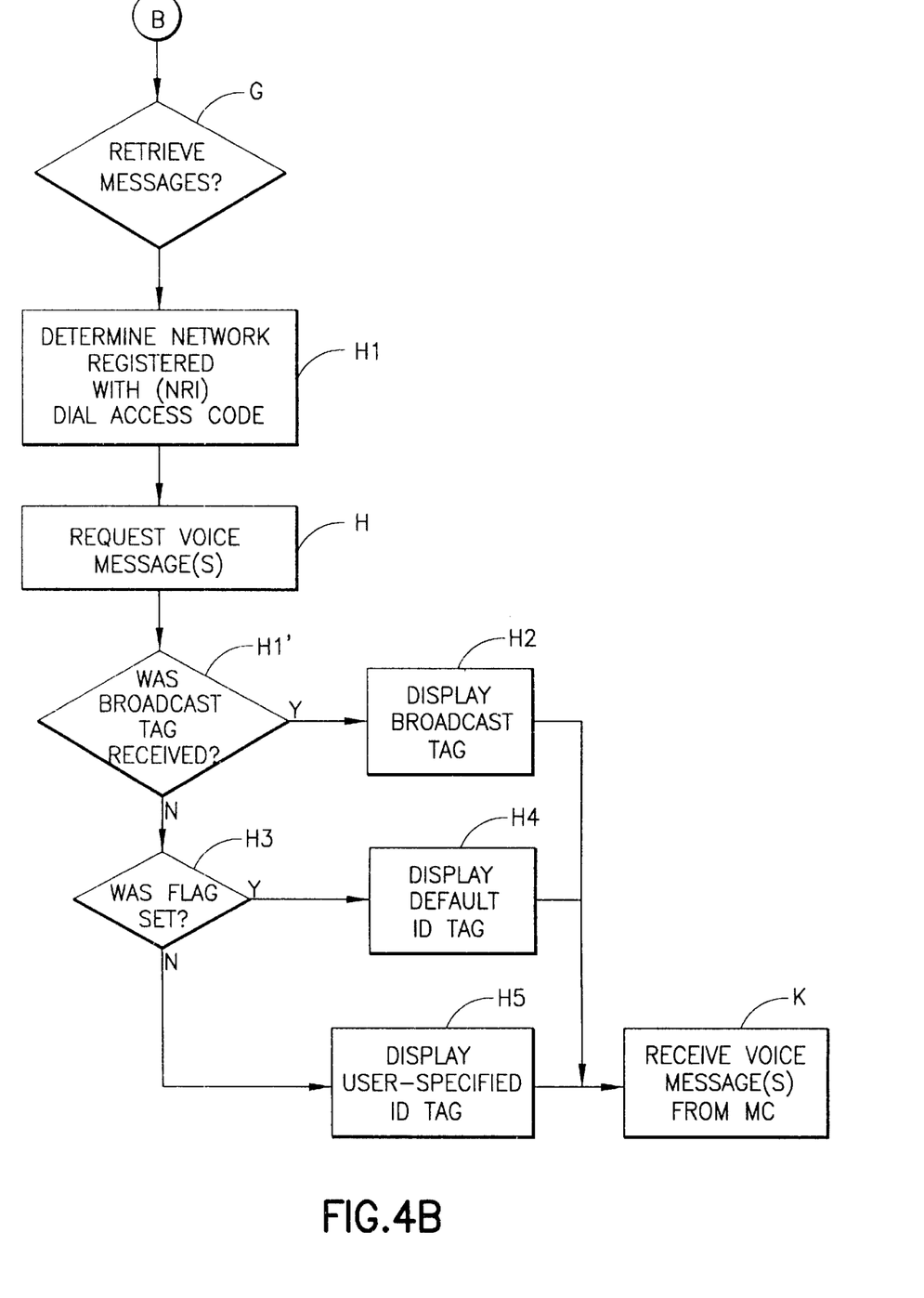

After the performance of the steps designated by the logic flow diagram of FIG. 4A, steps are performed in accordance with the logic flow diagram of FIG. 3B in a similar manner as was described above. However, according to this aspect of the invention, after the steps indicated by the logic flow diagram of FIG. 3B are performed, control is passed through connector B to the blocks of FIG. 4B, rather than to those of FIG. 3C. Referring to FIG. 4B, the steps designated by blocks G, H1, and H are performed in a similar manner as the steps of blocks G, H1, and H of FIG. 3C described above. However, after the performance of the step indicated by block H of FIG. 4B, control is passed to block H1'. At block H1' the mobile terminal 10 employs the NRI information to determine which network the terminal 10 is registered with, and determines whether or not identifier tag information (e.g., $AMIT_B$ or $PMIT_B$) was received from this network and stored in the memory 24. If yes at block H1', then the information specified by the identifier tag received from the network with which the mobile terminal 10 is registered is presented by the mobile terminal 10 to the user via display 20 (block H2). By example, it is assumed that the NRI information indicates that the mobile terminal 10 is registered with the autonomous network 35, and that the memory 24 stores identifier information as variable $AMIT_B$. In this case, the information (e.g., "WOS") specified by the variable $AMIT_B$ is displayed on display 20 at block H2. Prior to being displayed, this information may be processed in accordance with any suitable technique so that the information presented on the display 20 specifies, by example, "Calling WOS Voice Mailbox", or any other desired phrase. Thereafter, control passes to block K where the method continues in the manner described above.

If no at block H1', then control passes to block H3. At block H3, the user terminal 10 determines whether or not the flag was previously set (at block B6 or block C6) for employing the default identifier tag constant (e.g., $AMIT_D$ or $PMIT_D$) for the network indicated by the NRI information. If Yes at block H3, then the information specified by this default identifier tag constant is presented by the mobile terminal 10 to the user via display 20 (block H4). By example, for the case in which the NRI information indicates that the mobile terminal 10 is registered with the autonomous network 35, then the information (e.g., "calling Private Voice Mailbox") specified by constant $AMIT_D$ is displayed on display 20 at block H4. Also by example, assuming that the mobile terminal 10 registered with the public network 32 at block D, rather than with the autonomous network 32, then the information (e.g., "Calling Public Voice Mailbox") specified by constant $PMIT_D$ is displayed on display 20 at block H4. Thereafter, control passes to block K where the method of the invention continues in the above-described manner.

If No at block H3, then depending on whether the mobile terminal 10 is registered with the public network 32 or the autonomous network 35 (as indicated by the NRI information), the information specified by either variable AMIT or variable PMIT is presented on the display 20 (block H5). Thereafter, control passes to block K where the method of the invention continues in the above-described manner.

Although the aspect of the invention relating to the employment of identifier tags is described in the context of the default identifier tag being presented to the user only if the mobile terminal 10 stores no received identifier tag (e.g., $PMIT_B$ or $AMIT_B$) and no user-specified identifier tag (e.g., PMIT or AMIT), and also in the context of the user-specified identifier tag being presented to the user only if no received identifier tag is stored in the mobile terminal 10, it should be noted that the invention is not limited as such, and that the controller 18 may be pre-programmed so as to present these identifier tags in another manner.

Also, although described in the context of a mobile terminal having a keypad for receiving input from a user, it is within the scope of this invention to employ any other suitable type of user input interface. By example, if the mobile terminal is connected to a computer, the user can employ the computer's keyboard for entering information, and user-generated messages can be output from the computer via a cable or an IR link, and can displayed on the computer's screen. Alternatively, a suitable mobile terminal or computer voice recognition system can be employed by the user to enter the information.

Furthermore, and as was indicated previously, the teaching of this invention is not limited for use with any one particular type of message delivery/response protocol (such as the one specified by IS-136). Moreover, although described in the context of a voice mail message system, the teaching of this invention is not limited as such, and may be-employed in systems wherein other types of messages (e.g., non-voice messages) are stored in a memory for being provided to a user of a terminal, wherein it is desired to provide the user with a capability of automatically accessing these messages by operating the terminal during times when the terminal is registered with the network having the memory. Also, although described in the context of a cellular communications system, the teaching of this invention may also be employed in other suitable types of communications systems where it is desired to provide a terminal user with a capability of automatically accessing stored messages by operating the terminal during times when the terminal is registered with the network having a memory storing the messages. By example, the invention may be employed in portable telephone systems (typically used in residential applications) having an associated memory for storing voice mail messages for a user of a portable telephone.

Also, the actual storage of voice mail messages in the memories 33a and 33b can be accomplished using any suitable conventional techniques, and does not form a part of this invention per se.

Furthermore, and as was stated earlier, the teachings of this invention are not limited for use with only two networks.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a user terminal of a type that can be bidirectionally coupled to one of a plurality of networks, including at least a first network and a second network, each of the first and second networks having a respective message station, said message station of respective ones of said first and second networks having an associated storage device for storing at least one message for a user of the user terminal, the method comprising the steps of:

prompting the user to select an access code setup function for the storage device of either of the first or second networks;

monitoring an output of an input interface to detect information specifying that the user selects an access code setup function for the storage device of a selected one of the first and second networks;

prompting the user for defining an access code for the storage device of the selected one of the first and second networks; and monitoring an output of the input interface to detect information specifying the access code for the storage device of the selected one of the first and second networks, and, in response to detecting the information, storing the information specifying the access code in a memory of the user terminal.

2. A method for operating a user terminal of a type that can be bidirectionally coupled to one of a plurality of networks, including at least a first network and a second network, each of the first and second networks having a respective message station, said message station of respective ones of said first and second networks having an associated storage device for storing at least one message for a user of the user terminal, the method comprising the steps of:

prompting the user to select an access code setup function for the storage device of either of the first or second networks;

monitoring an output of an input interface to detect information specifying that the user selects an access code setup function for the storage device of a selected one of the first and second networks;

prompting the user for defining an access code for the storage device of the selected one of the first and second networks; and monitoring an output of the input interface to detect information specifying the access code for the storage device of the selected one of the first and second networks, and, in response to detecting the information, storing the information specifying the access code in a memory of the user terminal, and further comprising the steps of:

further prompting a user for specifying an identifier tag corresponding to the storage device of the selected one of the first and second networks; and further monitoring the output of the input interface to detect information specifying the identifier tag, and, in response to detecting the information specifying the identifier tag, storing the information specifying the identifier tag in the memory of the user terminal.

3. A method as set forth in claim 1, and further comprising the steps of:

registering the user terminal with one of the first and second networks;

if there is at least one message stored in the storage device of the network with which the user terminal is registered, receiving a first signal from the message station of the network with which the user terminal is registered, the first signal indicating that there is at least one message stored in the storage device of the network with which the user terminal is registered; and in response to receiving the first signal, notifying the user that there is at least one message stored in the storage device of the network with which the user terminal is registered.

4. A method as set forth in claim 3, and further comprising the steps of:

monitoring the output of the input interface to detect information specifying that the at least one message stored in the storage device indicated by the first signal be retrieved;

in response to detecting the information specifying that the at least one message stored in the storage device indicated by the first signal be retrieved, performing the steps of:

determining which one of the first and second networks the user terminal is registered with; and transmitting a second signal to the message station of the network with which the user terminal is registered, the second signal specifying that the at least one message stored in the storage device of this network be retrieved.

5. A method as set forth in claim 4, wherein further in response to detecting the information specifying that the at least one message stored in the storage device indicated by the first signal be retrieved, and after the performance of the step of transmitting, further steps are performed of:

receiving a third signal from the message station of the network with which the user terminal is registered, the third signal including the at least one message from the storage device of this network; and providing the at least one message from the third signal to the user.

6. A method as set forth in claim 3, wherein the user terminal includes a display, and wherein the step of notifying is performed by displaying a message on the display indicating that there is at least one message stored in the storage device.

7. A method as set forth in claim 1, wherein the input interface includes a keypad having a plurality of keys, and wherein the method further comprises the steps of:

registering the user terminal with one of the first and second networks;

if there is at least one message stored in the storage device of the network with which the user terminal is registered, receiving a first signal at the user terminal from the message station of the network with which the user terminal is registered, the first signal indicating that there is at least one message stored in the storage device of the network with which the user terminal is registered;

monitoring the output of the keypad to detect whether a predetermined at least one of the keys is depressed for at least a predetermined time period, and, in response to detecting that the predetermined at least one of the keys is depressed for at least the predetermined time period, performing the steps of:

determining which one of the first and second networks the user terminal is registered with; and transmitting a second signal to the message station of the network with which the user terminal is registered, the second signal specifying that the at least one message stored in the storage device of the network be retrieved, receiving a third signal from the message station, the third signal including the at least one message from the storage device of the network with which the user terminal is registered, and providing the at least one message from the third signal to the user.

8. A method as set forth in claim 2, wherein the method further comprises the steps of:

registering the user terminal with one of the first and second networks;

if there is at least one message stored in the storage device of the network with which the user terminal is registered, receiving a message waiting indicator signal from the message station of the network with which the user terminal is registered, the message waiting indicator signal indicating that there is at least one message stored in the storage device of the network with which the user terminal is registered;

in response to receiving the message waiting indicator signal at the user terminal, notifying the user that there is at least one message stored in the storage device of the network with which the user terminal is registered;

monitoring the output of the input interface to detect predetermined information, and, in response to detecting the predetermined information, performing the steps of:

determining the network with which the user terminal is registered;

transmitting, to the message station of the network with which the user terminal is registered, another signal specifying that the at least one message stored in the storage device of this network be retrieved, and presenting the identifier tag from the memory of the user terminal to the user.

9. A method as set forth in claim 5, wherein the memory also stores at least one of a default identifier tag, a user-specified identifier tag, and an identifier tag received by the user terminal from the network with which the user terminal is registered, and wherein between the performance of the steps of transmitting the second signal and receiving the third signal, a step is performed of presenting to the user one of the default identifier tag, the user-specified identifier tag, and the identifier tag received by the user terminal from the network with which the user terminal is registered.

10. A method as set forth in claim 5, wherein the memory of the user terminal stores a default identifier tag, wherein if the memory also stores a user-specified identifier tag, then between the performance of the steps of transmitting the second signal and receiving the third signal, a step is performed of presenting the user-specified identifier tag to the user, and wherein if the memory does not store the user-specified identifier tag, then between the performance of the steps of transmitting the second signal and receiving the third signal, a step is performed of presenting the default identifier tag to the user.

11. A method as set forth in claim 1, wherein the first network includes an autonomous network, and wherein the second network includes a public network.

12. A method for operating a user terminal of a type that can be bidirectionally coupled to one of a plurality of networks, including at least a first network and a second network, each of the first and second networks including a respective message station having an associated storage device for storing at least one message for a user of the user terminal, the method comprising the steps of:

registering the user terminal with one of the first and second networks;

if there is at least one message stored in the storage device of the network with which the user terminal is registered, receiving a first signal from the message station of this network, the first signal indicating that there is at least one message stored in the storage device of this network;

in response to receiving the first signal at the user terminal, notifying the user that there is at least one message stored in the storage device of the network with which the user terminal is registered;

monitoring an output of an input interface of the user terminal to detect information specifying that the at least one message stored in the storage device of the network with which the user terminal is registered be retrieved, and, in response to detecting this information, performing the steps of:

determining which one of the first and second networks the user terminal is registered with; and transmitting a second signal to the message station of the network with which the user terminal is determined to be registered, the second signal specifying that the at least one message stored in the storage device of this network be retrieved, said second signal comprising information that was previously stored in a memory of the user terminal, the information enabling the user terminal to access the storage device of the network to which the second signal is transmitted.

13. A method as set forth in claim 12, and further comprising the steps of:

receiving a third signal from the message station of the network with which the user terminal is registered, the third signal including the at least one message from the storage device of this network, and providing the at least one message from the third signal to the user.

14. A method as set forth in claim 12, wherein the user terminal includes a keypad having a plurality of keys, and wherein the method further comprises the steps of:

monitoring an output of the keypad to detect whether a predetermined at least one of the keys is depressed for at least a predetermined time period, and, in response to detecting that the predetermined at least one of the keys is depressed for at least the predetermined time period, performing the steps of:

determining which one of the first and second networks the user terminal is registered with; and transmitting a second signal to the message station of the network with which the user terminal is determined to be registered, the second signal specifying that the at least one message stored in the storage device of this network be retrieved.

15. A method as set forth in claim 14, wherein after the step of transmitting is performed, further steps are performed of:

receiving a third signal from the message station of the network with which the user terminal is registered, the third signal including the at least one message from the storage device of this network, and providing the at least one message from the third signal to the user.

16. A method as set forth in claim 14, wherein a memory of the user terminal stores at least one of a default identifier tag, a user-specified identifier tag, and an identifier tag received by the user terminal from the network with which the user terminal is registered, and wherein between the performance of the steps of transmitting the second signal and receiving the third signal, a step is performed of presenting to the user one of the default identifier tag, the user-specified identifier tag, and the identifier tag received by the user terminal from the network with which the user terminal is registered.

17. A method as set forth in claim 12, wherein the first network includes an autonomous network and wherein the second network includes a public network.

18. A method for operating a user terminal of a type that can be bidirectionally coupled to one of a plurality of networks, including at least a first network and a second network, the user terminal having a keypad including a plurality of keys, each of the first and second networks including a respective message station having an associated storage device for storing at least one message for a user of the user terminal, the method comprising the steps of:

monitoring an output of the keypad to detect whether a predetermined at least one of the keys is depressed for at least a predetermined time period, and, in response to detecting that the predetermined at least one of the keys is depressed for at least the predetermined time period, performing the steps of:

determining which one of the first and second networks the user terminal is registered with; and transmitting a first signal to the message station of the network with which the user terminal is determined to be registered, the first signal specifying that the at least one message stored in the storage device of this network be retrieved, said first signal comprising information that was previously stored in a memory of the user terminal, the information enabling the user terminal to access the storage device of the network to which the first signal is transmitted.

19. A method as set forth in claim 18, wherein after the step of transmitting is performed, further steps are performed of:

receiving a second signal from the message station of the network with which the user terminal is registered, the second signal including the at least one message from this network; and providing the at least one message from the third signal to the user.

20. A method as set forth in claim 18, wherein the first network includes an autonomous network, and wherein the second network includes a public network.

21. A user terminal for use in at least one of a first communication network and a second communication network, each of the first and second communication networks including a respective message station having an associated storage device for storing at least one message for a user of the user terminal, the user terminal comprising:

a transceiver for bidirectionally coupling said user terminal to said message station of respective ones of said first and second communication networks;

a first user-interface;

a memory;

a second, input user-interface;

a controller coupled to said transceiver, said memory, and to said first and second user-interfaces, said controller operating under the control of a stored program for controlling said first user-interface so as to prompt the user for defining an access code for the storage device of a selected one of said first and second communication networks, said controller also operating under the control of said stored program for monitoring an output of the second user-interface to detect information specifying the access code for said storage device, and for storing the information specifying the access code in the memory in response to detecting the information.

22. A user terminal as forth in claim 21, wherein said controller also operates under the control of the stored program for controlling said first user-interface so as to prompt the user for defining an identifier tag that corresponds to the storage device of the selected one of said first and second communication networks, and wherein said controller further operates under the control of the stored program for monitoring the output of the second user-interface to detect information defining the identifier tag, and for storing the information defining the identifier tag in the memory in response to detecting the information defining the identifier tag.

23. A user terminal as set forth in claim 21, wherein said first communication network includes an autonomous communication network, and wherein said second communication network includes a public communication network.

24. A user terminal of a type that can be coupled through RF links to one of a plurality of networks, including at least one of a first communication network and a second communication network, each of said first and second communication networks including a respective message station having an associated storage device for storing at least one message for a user of the user terminal, said message station of each of said communication networks being responsive to the user terminal registering with the communication network for determining whether the storage device associated with the message station stores the at least one message, and if the message station determines that the storage device stores the at least one message, the message station broadcasts a message waiting indicator signal, said user terminal comprising:

a transceiver for bidirectionally coupling said user terminal to said message station of respective ones of said first and second networks;

an input user-interface;

an output user-interface; and a controller coupled to said transceiver, said input user-interface, and to said output user-interface, said controller operating under the control of a stored program for registering the user terminal with one of the first and second communication networks, said controller also operating under the control of the stored program and being responsive to a receipt of the message waiting indicator signal for controlling said output user-interface so as to notify the user that there is at least one message stored in the storage device of the communication network that transmitted the message waiting indicator signal, wherein said controller also operates under the control of the stored program for monitoring an output of the input user-interface to detect information specifying that the at least one message stored in the storage device be retrieved, said controller being responsive to detecting this information for determining which one of the communication networks the user terminal is registered with, and for outputting a request signal to the transceiver for transmission to the message station of the communication network with which the user terminal is determined to be registered, the request signal requesting that the at least one message stored in the storage device of this communication network be retrieved.

25. A user terminal as set forth in claim 24, wherein said input-interface includes a plurality of user-activated data entry keys, wherein said controller also operates under the control of the stored program for monitoring an output of the input user-interface to detect whether a predetermined at least one of the data entry keys is depressed for at least a predetermined time period, said controller being responsive to detecting that the predetermined at least one of the data entry keys is depressed for at least the predetermined time period for determining which one of the communication networks the user terminal is registered with, and for outputting the request signal to the transceiver.

26. A user terminal as set forth in claim 24, wherein said user terminal further comprises a memory that is coupled to said controller and said input user-interface, wherein said memory is for storing a plurality of identifier tags, said plurality of identifier tags including a predefined default identifier tag, an identifier tag specified by the user via the input user-interface, and an identifier tag received by the user terminal during the performance of the step of registering, wherein said controller also operates under the control of the stored program for monitoring an output of the input user-interface to detect information specifying that the at least one message stored in the storage device be retrieved, said controller being responsive to detecting this information for outputting one of said plurality of identifier tags to said output user-interface for presenting the identifier tag to the user.

27. A user terminal as set forth in claim 24, wherein said first communication network includes an autonomous communication network and wherein said second communication network includes a public communication network.

* * * * *